US008621959B2

(12) United States Patent
Brown et al.

(10) Patent No.: US 8,621,959 B2
(45) Date of Patent: Jan. 7, 2014

(54) COMPACT ACTIVE MATERIAL ACTUATED TRANSMISSIONS FOR DRIVING MULTIPLE OUTPUT LOADS FROM A SINGLE PRIMARY ACTUATOR

(75) Inventors: James H. Brown, Costa Mesa, CA (US); Alan L. Browne, Grosse Pointe, MI (US); Nilesh D. Mankame, Ann Arbor, MI (US); Nancy L. Johnson, Northville, MI (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 768 days.

(21) Appl. No.: 12/691,189

(22) Filed: Jan. 21, 2010

(65) Prior Publication Data

US 2011/0175474 A1    Jul. 21, 2011

(51) Int. Cl.
*F16H 37/06* (2006.01)
*F16H 53/00* (2006.01)
(52) U.S. Cl.
USPC ..................................... 74/665 L; 74/568 M
(58) Field of Classification Search
USPC ....... 74/665 F, 665 G, 665 A, 665 B; 310/78,
310/306; 701/49; 60/527, 526, 525;
192/69.91, 82 T
See application file for complete search history.

(56) References Cited

U.S. PATENT DOCUMENTS 3,910,131 A * 10/1975 Richards ........................ 74/331
4,836,496 A * 6/1989 Abujudom et al. ............. 251/11
5,070,697 A * 12/1991 Van Zeggeren ................ 60/527
5,462,337 A * 10/1995 Yamakami ............... 297/344.13
6,374,608 B1 * 4/2002 Corris et al. .................... 60/528
7,226,379 B2 * 6/2007 Ibamoto et al. ............... 475/221
7,919,938 B2 * 4/2011 Harvey et al. ................... 318/14
8,011,262 B2 * 9/2011 Pedrazzini-Bertolazzi .... 74/331
8,050,830 B2 * 11/2011 Komeda et al. ................ 701/51
2002/0000354 A1 * 1/2002 Cooper ........................ 192/82 T
2002/0104397 A1 * 8/2002 Bowen ............................ 74/329
2007/0214906 A1 * 9/2007 Fahland et al. ................. 74/340
2007/0227296 A1 * 10/2007 Bordwell et al. ........... 74/665 G
2008/0120976 A1 * 5/2008 Kennedy et al. ................ 60/528
2011/0146265 A1 * 6/2011 Joseph et al. ................... 60/527
2011/0167956 A1 * 7/2011 Holmes et al. .............. 74/665 B

OTHER PUBLICATIONS

J.A. Shaw, "Tips and Tricks for Characterizing Shape Memory Alloy Wire: Part 1—Differential Scanning Calimetry and Basic Phenomena", Experimental Tecniques, pp. 55-62, Sep.-Oct. 2008.
L.C. Brinson, "Simplifications and Comparisons of Shape Memory Alloy Constitutive Models", Journal of Intelligent Material Systems and Structures, vol. 7, Jan. 1996, pp. 108-114, Technomic Publishing Co., Inc.

* cited by examiner

*Primary Examiner* — Ha D Ho
*Assistant Examiner* — Jude Agendia

(57) ABSTRACT

Power is selectively transferred from a primary actuator to one of a plurality of output shafts with a transmission including a plurality of output members coupled to an input member, the input member being coupled to the primary actuator. A first active material actuator includes a mechanical coupling feature coupling one of the plurality of output shafts to one of the plurality of output members when the active material actuator is activated.

16 Claims, 5 Drawing Sheets

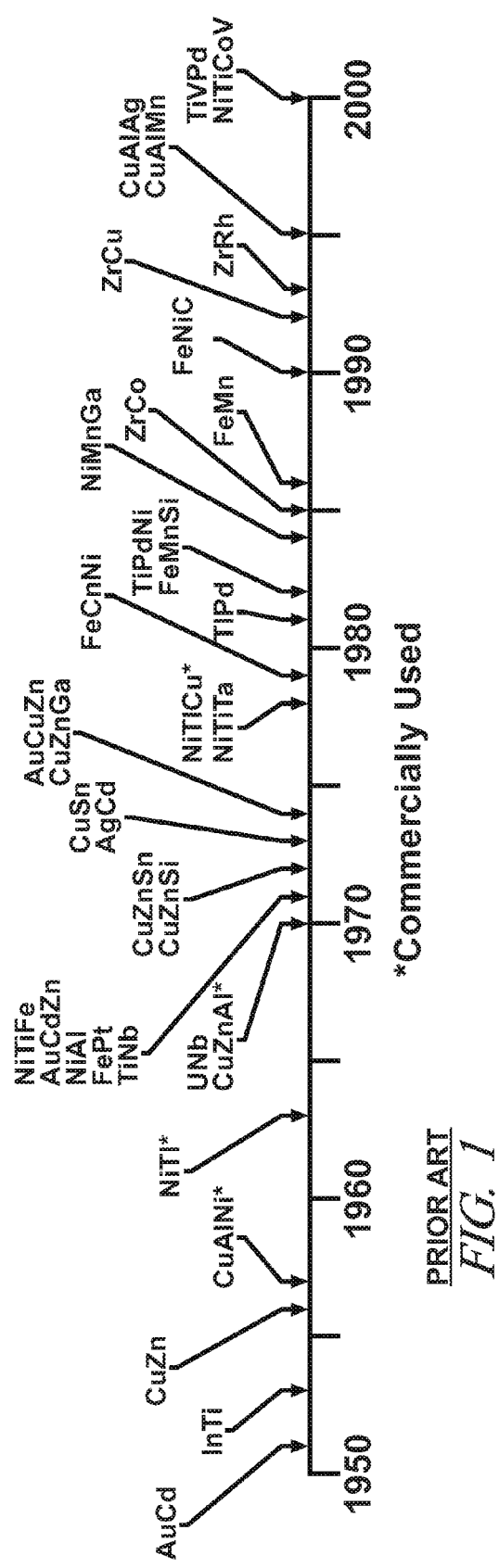
PRIOR ART
FIG. 1
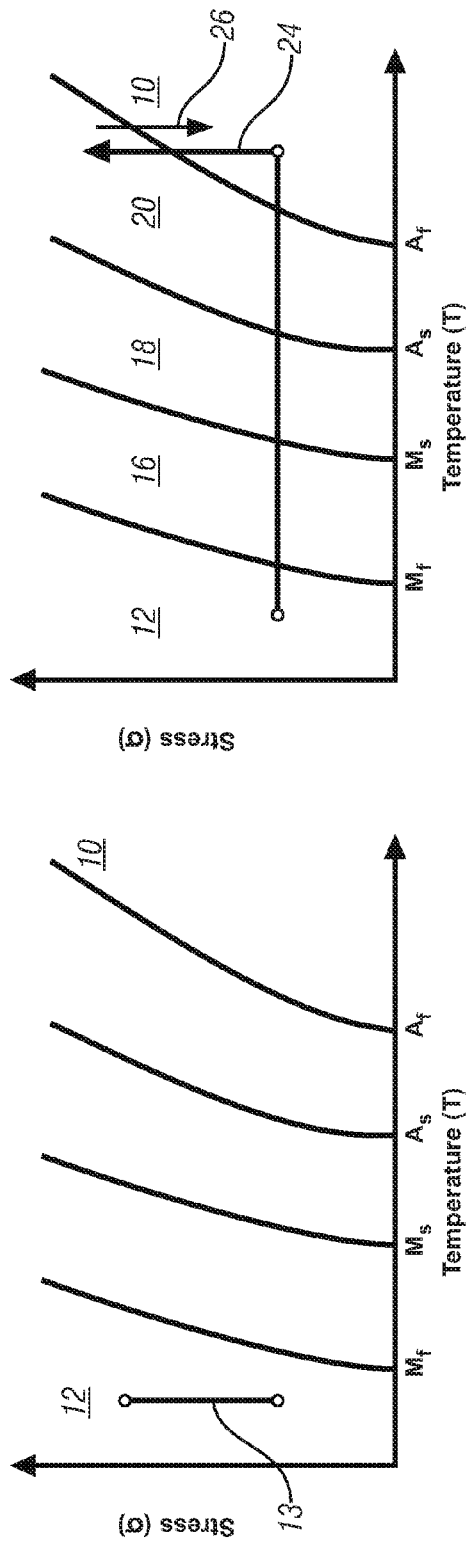
FIG. 2A
FIG. 2B

COMPACT ACTIVE MATERIAL ACTUATED TRANSMISSIONS FOR DRIVING MULTIPLE OUTPUT LOADS FROM A SINGLE PRIMARY ACTUATOR

TECHNICAL FIELD

This disclosure is related to transferring output work to selectively actuated outputs using active materials.

BACKGROUND

The statements in this section merely provide background information related to the present disclosure and may not constitute prior art.

Work producing devices providing output work are useful in many applications. An automobile provides numerous applications requiring actuation by an output torque (i.e., output work) such as an electric motor. However, using independent electric motors to actuate different features results in increased mass and cost of the automobile. Currently there are methods where electric motors operate several outputs, but actuation is still required.

It is known, for example, that solenoids, switches, relays, electromagnets, transducers and drivers are capable of providing actuation to multiple shafts from a single electric motor. However, use of such actuation devices often contributes to increased cost and mass of the system, making use of these actuation devices counterproductive. Currently, methods capable of providing actuation with relatively low cost and mass include the use of active materials. Active materials may include shape memory alloys (SMAs), electroactive polymers (EAPs), piezoelectric, magnetostrictive and electrorestrictive materials.

SUMMARY

A method for selective power transfer from a primary actuator to at least one of a plurality of outputs includes monitoring a desired output configuration, and selectively actuating an active material actuator to achieve the desired output configuration by mechanically coupling one of the plurality of outputs to the primary actuator.

An apparatus for selective power transfer from a primary actuator to one of a plurality of output shafts includes a transmission including a plurality of output members coupled to an input member, the first input member being coupled to the primary actuator. The apparatus further includes an active material actuator including a mechanical coupling feature coupling one of the plurality of output shafts to one of the plurality of output members when the active material actuator is activated.

BRIEF DESCRIPTION OF THE DRAWINGS

One or more embodiments will now be described, by way of example, with reference to the accompanying drawings, in which:

FIG. 1 is a pictorial timeline of discovered SMAs, in accordance with the present disclosure;

FIGS. 2A and 2B are phase diagrams of critical stresses of austenite-martensite crystal transformations as functions of temperature, in accordance with the present disclosure;

DETAILED DESCRIPTION

Figure 3:
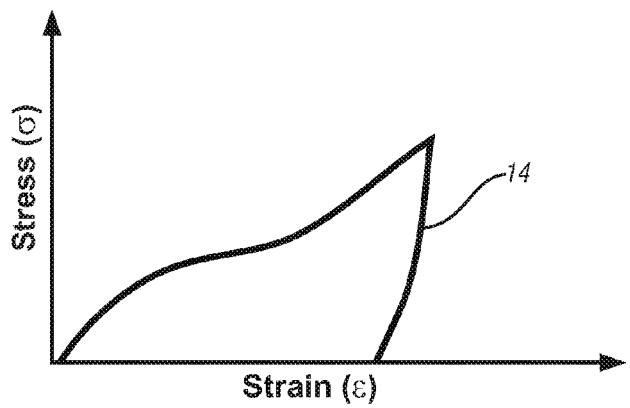
FIG. 3 is a diagram of stress and strain of a material, in accordance with the present disclosure.

Referring now to the drawings, wherein the showings are for the purpose of illustrating certain exemplary embodiments only and not for the purpose of limiting the same, FIG. 1 displays a timeline of shape memory alloys (SMAs) that have been discovered since the mid-1900s to late 1900s. Many of these alloys consist of precious metals or only exhibit useful properties as single crystals, which do not lend them to practical use as low cost actuation devices. Some alloys are known that include required functionality at low cost. These alloys include certain copper alloys (CuAlZn) and nickel-titatnium-based alloys, such as near-equiatomic NiTi, known as Nitinol and some ternary alloys such as NiTiCu and NiTiNb. One especially useful embodiment includes NiTi-based SMAs, where NiTi-based SMAs have the best memory properties of all the known polycrystalline SMAs. The NiTi family of alloys can withstand large stresses and can recover strains near 8% for low cycle use or up to about 2.5% for high cycle use. This strain recovery capability can enable the design of SMA-actuation devices in apparatuses requiring the selective transfer of torque from a torque generating device to each of a plurality of output shafts.

Referring now to FIGS. 2A-2B, a phase diagram of critical stresses for conversion of austenite-martensite crystal transformations as functions of temperature for a SMA is displayed. SMAs have the characteristic of very large recoverable strains due to crystallographic transformations between martensite and austenite. As a result, SMAs are desirable because they provide large shape changes or large force generation.

Referring to FIGS. 2A and 3, SMA behavior is due to a reversible thermoelastic crystalline phase transformation between a high symmetry parent phase, austenite 10, and a low symmetry product phase, martensite 12. The phase changes between austenite 10 and martensite 12 occur as a result of both stress and temperature. Formation of the martensitic phase 12 under stress 13 results in the formation of preferred crystalline variant orientations which leads to a large induced strain.

As shown in FIG. 3, the temperature dependent strain is recovered either in a hysteresis loop upon heating 14 or upon unloading the material. This capability for reversible, controllable large strains is the basis of interest in selecting SMAs as control materials. Large shape changes can be induced easily with these materials. In a constrained situation, large stresses can be imparted to the connected structural components.

Referring to FIG. 2B, under a static load and at a sufficiently low temperature, the material is stabilized at martensite 12. At a sufficiently high temperature, the material is stabilized at austenite 10. Martensite start (Ms) and finish (Mf) indicate temperatures where the phase transformation to martensite 12 starts and finishes, respectively. Austenite start (As) and finish (Af) indicate temperatures where the phase transformation to austenite 10 starts and finishes, respectively. At temperatures below Mf, an SMA material is stable in the martensite 12 phase. When an SMA material in the martensite 12 phase is heated under constant stress, the transformation to the austenite phase 10 begins only when the temperature exceeds As at a third phase 20. From this point, the material progressively transforms to the austenite phase 10 until the transformation is complete at Af. As shown in FIG. 2B, at temperatures above Af, the material is stable in the austenite 10 phase at this static stress 22. However, applying a sufficient load 24 to the material can induce a solid-state, diffusionless transformation from austenite 10 to tensile martensite thereby resulting in an induced strain to the material. During subsequent unloading 26 at the same temperature the material reverts to austenite 10, wherein the strain is wholly or partially recovered.

Figure 4:
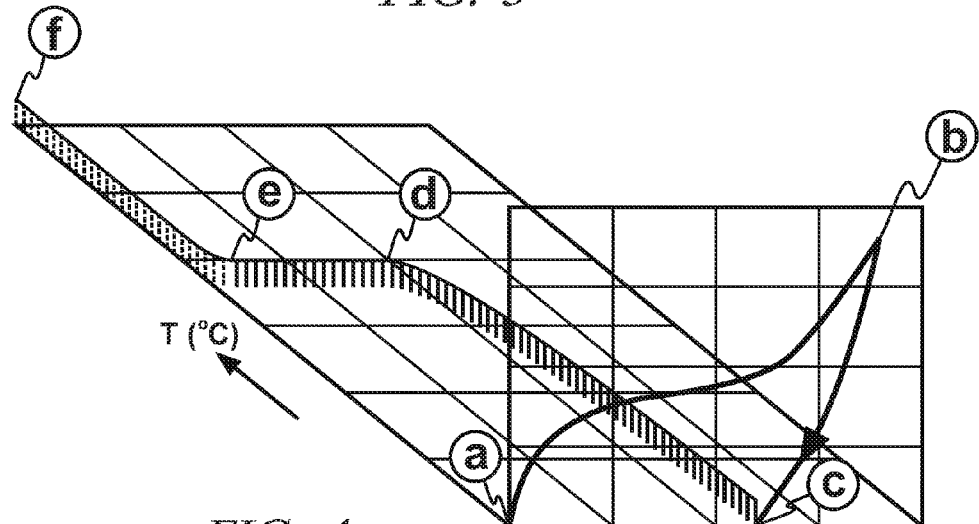
FIG. 4 is a graphical representation of a material in a three-dimensional plot against stress, strain and temperature, in accordance with the present disclosure.

Referring to FIG. 4, a SMA wire in a three-dimensional plot against stress (vertical axis), strain (horizontal axis), and temperature (oblique axis) is shown in accordance with an exemplary embodiment. Between reference points a and b a load is applied to an SMA material in its martensite phase, yielding a strain. While remaining at a static temperature, the material is unloaded between reference points b and c. The load-unload cycle between reference points a-c results in a material stabilized in the martensite phase and having an induced strain. Increasing the temperature of the material results in a relatively static strain between reference points c and d. However, between reference points d and e the strain decreases (i.e., recovers) rapidly at a material specific temperature, wherein the transformation from martensite to austenite occurs. At reference point f, the transformed material is stabilized in the austenite phase. Upon cooling from austenite to martensite, little, if any, strain (or shape change) is usually observed, unless, the material has been heavily processed to have a so-called two-way shape memory effect. An alternative to using an SMA material with two-way shape memory effect involves the use of a biasing member to induce strain on the material upon cooling.

Figure 8:
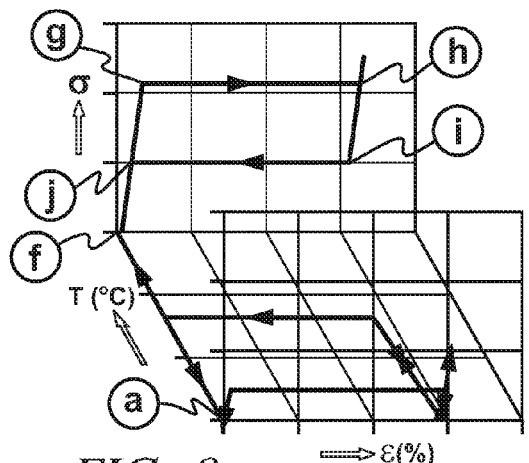
FIG. 8 is a graphical representation of a material in a three-dimensional plot against stress, strain and temperature, in accordance with the present disclosure.

Referring to FIG. 8, an SMA wire in a three-dimensional plot against stress (vertical axis), strain (horizontal axis), and temperature (oblique axis) is shown illustrating an SMA that exhibits both: the shape memory effect and superelastic effect under different conditions of load and temperature. Between reference points f and g, a load is applied to an SMA material in its austenite phase, yielding a strain between reference points f and h. While remaining at a constant temperature, the material is partially unloaded between reference points h and f, wherein a majority of the induced strain is recovered between reference points i and j. While still remaining at the constant temperature, the material is completely unloaded between reference points j and f, wherein the strain is wholly recovered in the austenite phase. Between reference points f and a, the SMA material is cooled to a material specific temperature, wherein the material changes phase from austenite to martensite.

Figure 5:
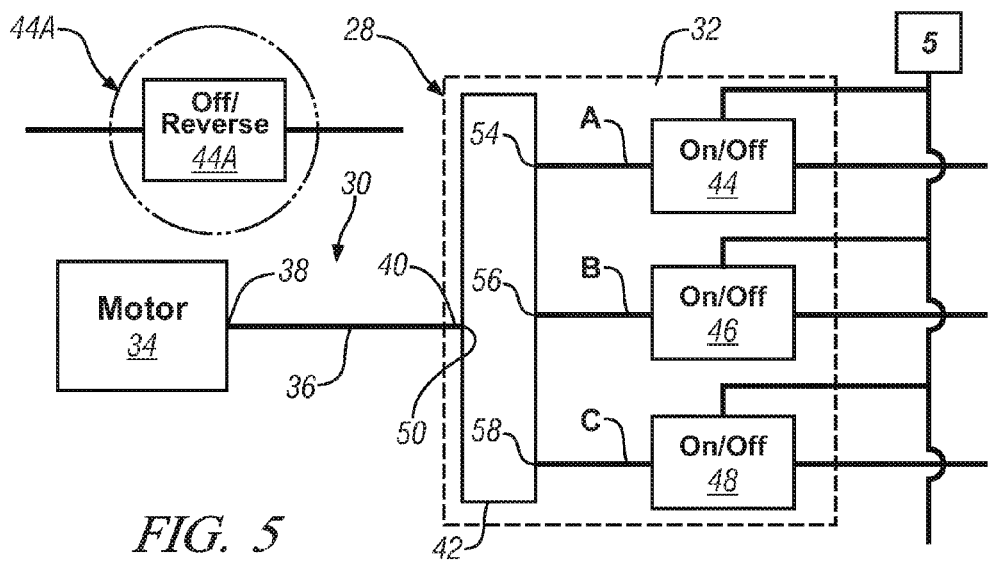
FIG. 5 is a schematic diagram of a selective torque transferor for transferring output torque to a plurality of output shafts, in accordance with the present disclosure.

Referring now to FIG. 5, in accordance with an exemplary embodiment, a selective torque transferor 28 for transferring output torque to a plurality of output shafts A, B and C is shown. The selective torque transferor 28 includes a torque generating device 30 and a torque selection system 32, wherein the torque selection system 32 and the torque generating device 30 are in mechanical communication. The torque generating device 30, a primary actuator, further includes a motor 34 and a drive shaft 36. In the exemplary embodiment the motor 34 is a DC electric motor benefitting from a DC motor high starting load, low cost and low mass. However, it will be appreciated that alternative embodiments include any primary actuator capable of producing work, such as induction motors, gas turbines, liquid turbines, pneumatic motors, or hydraulic motors. The drive shaft 36 provides mechanical communication between the motor 34 and the torque selection system 32. The drive shaft 36 includes first and second ends 38, 40, respectively, wherein the first end 38 is rotatably coupled to the motor 34, and the second end 40 is rotatably coupled to the toque selection system 32.

In accordance with an alternative embodiment, and still referring to FIG. 5, it will be appreciated that many types of work can similarly be embodied such as linear, translator, arcuate, shear and compressive. Throughout the disclosure, output work or power will be described for simplicity as output torque, but it will be appreciated that any type of output work or power may be provided.

The torque selection system 32 further includes a transmission 42 and the plurality of output shafts A, B and C. The transmission 42 further includes an input member 50 and a plurality of output members 54, 56 and 58, wherein drive input member 50 is rotatably coupled to the second end 40 of the drive shaft 36 as well as to the output members 54, 56 and 58. Each output shaft A, B and C is associated with an active material actuator 44, 46 and 48 and an output member 54, 56 and 58, wherein active material actuator 44 is associated with output shaft A and output member 54; active material actuator 46 is associated with output shaft B and output member 56; and active material actuator 48 is associated with output shaft C and output member 58. For simplification, only operation of output shaft A, output member 54 and active material actuator 44 will be described. Activation of active material actuator 44 causes output member 54 and output shaft A to be coupled. While output member 54 is always coupled to the drive input member 50, coupling between output member 54 and output shaft A provides power to be routed from the motor 34 to the output of load A when active material actuator 44 is activated. De-activation of the active material actuator 44 results in decoupling of output member 54 and output shaft A, wherein the power delivered from the motor 34 to the output of shaft A is severed. Operation of output shafts B and C, output members 56 and 58 and active material actuators 46 and 48 are identical. In one exemplary embodiment the transmission 42 is a reduction gear set. However, it will be appreciated that many alternative embodiments of the transmission 42 are contemplated, including common gears, gear trains, planetary gear sets, fluid transmissions, linkages, belt drives and rope drives well known in the art, and the disclosure is not intended to be limited to the particular exemplary embodiments described herein. Additionally, the gearing on each output shaft A, B or C may be of a different ratio and type.

The above output shafts are described in connection with transmission 42 and output gears 54, 56, and 58. However, it will be appreciated that the configuration described above is exemplary, and many configurations are envisioned for use with the methods described herein. For simplicity, outputs can be discussed being selectively fixed to the primary actuator, but it is understood that gear sets, splitting devices, and other torque management devices are known and likely to exist between an output being driven and the primary actuator.

The active material actuators are controlled by signals from a control device. Exemplary control module 5 is depicted including connections to active material actuators 44, 46 and 48. An exemplary control module 5 includes the ability to sense the operating environment (including the ambient temperature, the status of the different active material actuators, the status of the primary actuator, etc) through one or more sensors, a processor and storable code including logic to enable, disable, or provide any other instructions to the actuators based on a sensed or inferred/anticipated condition.

FIG. 5 depicts three output shafts with all three shafts including active material actuators to select engagement of each of the shafts individually. However, it will be appreciated that the configuration of a transmission or gearbox enabling use of active material actuators can take many forms. As described herein, selective engagement of different gear configurations can enable selection of a forward or reverse direction of the same output shaft. It will be appreciated that similar selection of gear configurations could allow different gear reduction factors between a motor and an output shaft. Such a configuration could allow, for example, a single shaft to be driven with a minimal gear reduction factor when the output shaft is solely activated, while a different gear configuration with a greater gear reduction factor can be used for the same output shaft when additional output shafts are to be driven at the same time. Similarly, not all output shafts in a configuration need to be selectively actuated. For example, in an exemplary configuration with output shafts D, E, and F, shafts D and E can be selectively actuated, while shaft F can be fixedly connected to the configuration, enabling F, D+F, E+F, and D+E+F actuation states.

Control module 5 operates programming to control the different actuators within the system. A desired output shaft configuration can be monitored or determined by control module 5. The desired output shaft configuration can be determined based upon the available power input to said selective torque transferor 28 from said torque generating device 30 and the desired power to be transferred to the plurality of output shafts A, B and C. In one exemplary use, an automotive seat adjustment can be controlled by a single control module controlling a desired output shaft configuration for three output shafts controlling three different seat adjustments, for example, including seat vertical elevation, seat base fore-aft position, and seat back recline, wherein the required power to control the three output shafts controlling the three different seat adjustments is distributed from a DC electric motor benefitting from a high starting load. The control module in this application can monitor seat control inputs and/or can receive commands from a seat position memory program elsewhere in the vehicle.

The control module can be in communication with the actuators and any input devices through direct circuit connections. In the alternative, the control module can utilize a network device, such as a control area network (CAN) to communicate with the other devices.

As used herein, control module, module, controller and similar terms include various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A control module may have a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In accordance with the presently described embodiments, and still referring to FIG. 5, operation of the active material actuator 44 is described in further detail. When actuated, the active material actuator 44 provides rotatable engagement between the output shaft A and the output gear 54 of the transmission 42. Although FIG. 5 shows three output shafts and three correspondingly located active material actuators, the invention is not limited to any specific number of output shafts or active material actuators. So long as output torque across the drive shaft 36 may be selectively utilized, engaged output shafts A, B and C may receive torque simultaneously in any combination selected by the operator. However, it should be appreciated that the sum of all the power utilized across the plurality of output shafts A, B and C may not exceed the total output power the motor 34 is capable of generating. When the active material actuator 44 is in the "on" position, the output shaft A is rotatably engaged to the output gear 54 of the transmission 42. Likewise, when the active material actuator 44 is in the "off" position, the output shaft A is disengaged from the output gear 54 of the transmission 42. Alternatively, an active material actuator 44A may provide a "reverse" function to the output shaft A if the application so desires. For active material actuator 44A to provide the reverse function to output shaft A, an additional gearset within the transmission 42 would be required. Likewise, active material actuators 46 and 48 provide engagement between output shafts B and C, respectively, and output gears 56 and 58, respectively, in the same manner as described above with the active material actuator 44. In one exemplary embodiment, the active material providing the actuation is preferably a Shape Memory Alloy (SMA). However, it will be appreciated that many alternative embodiments of active materials include electroactive polymers (EAPs), piezoelectric ceramic and polymer, magnetostrictive and electrorestrictive materials.

Figure 6A:
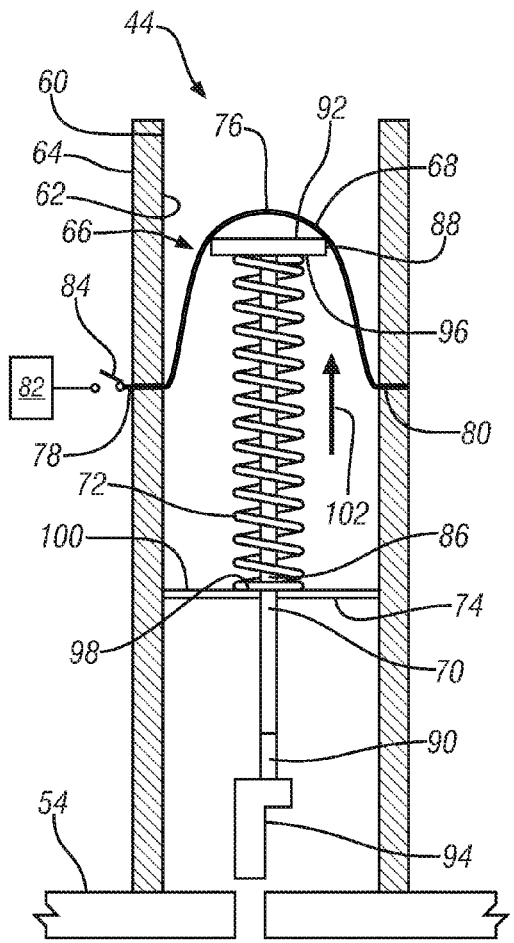
FIGS. 6A and 6B are detailed views of an active material actuator of the selective torque transferor, in accordance with the present disclosure.
Figure 6B:
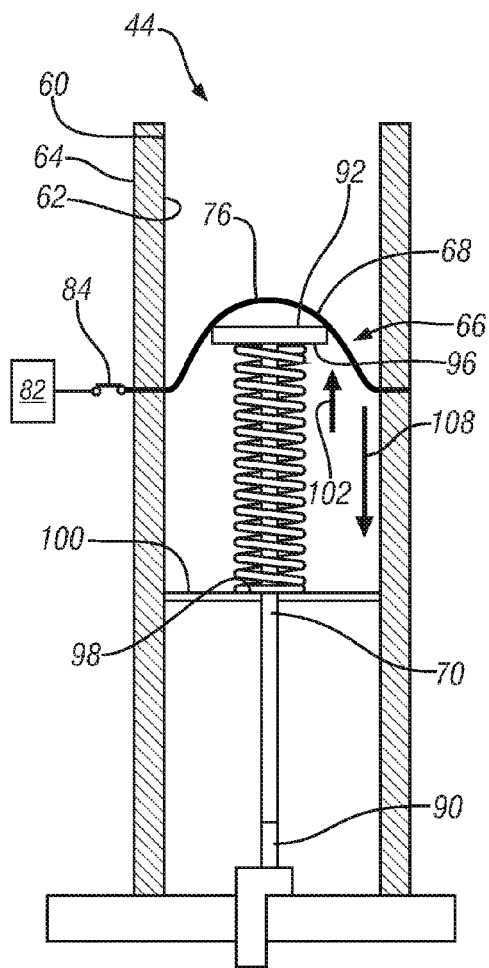

Referring now to FIGS. 6A and 6B, in accordance with an exemplary embodiment, a detailed view of the active material actuator 44 is shown and described. The active material actuator 44 includes a tubular housing 60 having circumferential inner and outer surfaces 62, 64, respectively, and an engagement mechanism 66 enclosed within the inner surface 62 of the housing 60. The engagement mechanism 66 further includes an active material member 68, a plunger arm 70, a biasing member 72 and a biasing member support 74. The exemplary active material member 68 is a continuous wire of constant cross-section and includes a protruded portion 76 and two flat terminal ends 78, 80, respectively, wherein each end 78 and 80 is crimped to the inner surface 62 of the housing 60 for mechanical anchorage and electrical connections. It will be appreciated that active material members can be utilized in a wide variety of shapes and configurations depending upon the desired function of the device and the actuation force required of the member. The active material member 68 is electrically coupled to an electrical energy source 82, wherein the active material member 68 is initially energized by the electrical energy source 82 when operation calls for the active material actuator 44 to be in the "on" position. The electrical energy source 82 may provide power to drive the active material member 68 from a generator, motor or a combination thereof, including power from the vehicle electrical system or from a local stored energy source such as a capacitor bank. Energization of the active material member 68 is effected by closure of switch 84 which may take any suitable form including mechanical, electromechanical or solid-state. The plunger arm 70 includes a shaft section 86, an end bar 88 and a driver section 90. The end bar 88 and the driver section 90 are located on opposite ends of the shaft section 86. The end bar 88 extends perpendicular to the shaft section 86 and is mechanically coupled to the active material member 68, wherein a top surface 92 of the end bar 88 is in contact with the protruded portion 76 of the active material member 68. The driver section 90 of the plunger arm 70 is configured to drive a sliding key 94 to engage the output shaft A to the output gear 54 of the gearbox 42 when the active material actuator 44 is in the "on" position. Similarly, when the active material actuator 44 is in the "off" position, the biasing member 72 retracts the plunger arm 70, wherein the driver section 90 of the plunger arm 70 is configured to pull the sliding key 94 to disengage the output shaft A from the output gear 54 of the transmission 42. Alternatively, the active material actuator 44 may be configured to engage the output shaft A to the output gear 54 of the transmission 42 when the active material actuator 44 is in the "off" position. It will be appreciated that the sliding key 94 can be utilized as any locking feature capable of providing engagement between the output shaft and the output gear. The biasing member 72 is located between the biasing member support 74 and the end bar 88 of the plunger arm 70, wherein a first end 96 of the biasing member 72 is in contact with a bottom surface 96 of the end bar 88, and a second end 98 of the biasing member 72 is in contact with a top surface 100 of the biasing member support 74. As shown in FIGS. 6A and 6B, the biasing member 72 is configured to exert an upward bias force 102 against the end bar 88 of the plunger arm 70 and thereby bias the plunger arm 70 towards the active material member 68, wherein the end bar 88 and the active material member 68 are mechanically coupled. It should be appreciated that the end bar 88 and the active material member 68 need not be in direct physical contact due to the need to electrically isolate the active material member 68 from the rest of the active material actuator 44. The biasing member support 74 is stationary and mounted to the inner surface 64 of the housing 60. The biasing member support 74 further includes a hole through its axial center configured to allow the plunger arm 70 to slide freely during actuated and unactuated positions. Likewise, the features and operation of active material actuators 46 and 48 are the same with respect to active material actuator 44 as described above. It will be appreciated that the actuator of FIGS. 6A and 6B are exemplary embodiments that an SMA actuator may take, and the disclosure is not intended to be limited to this particular exemplary embodiment.

Referring to FIGS. 5 and 6A, the active material actuator 44 is in the unactuated position. As described above, when the active material actuator is in the "off" position, the output shaft A is disengaged from the output gear 54. As shown in FIG. 6A, the switch 84 is open, therefore the active material member 68 is deenergized at a colder temperature in the martensite phase. It should be appreciated that the active material member 68 is an SMA material, wherein the SMA material is chosen such that the ambient or operating temperature of the active material actuator 44 is less than the As temperature of the SMA. Hence, when the active material member 68 is not electrically heated, it remains in the martensite phase and is protected against accidental actuation due to a rise in the operating temperature. Subsequently, the biasing member 72 is exerting the bias force 102 to the plunger arm 70, wherein the top surface 92 of the end bar 88 of the plunger arm 70 is exerting a stress or load against the protrusion portion 76 of the active material member 68. The stress exerted against the active material 68 imposes a strain and thereby deforms the active material member 68. When the active material actuator 44 is unactuated, the biasing member 72 retracts the plunger arm 70, wherein the driver section 90 of the plunger arm 70 is configured to pull the sliding key 94 to disengage the output shaft A from the output gear 54 of the transmission 42. Likewise, the features and operation of active material actuators 46 and 48 are the same with respect to active material actuator 44 as described above.

Figure 7A:
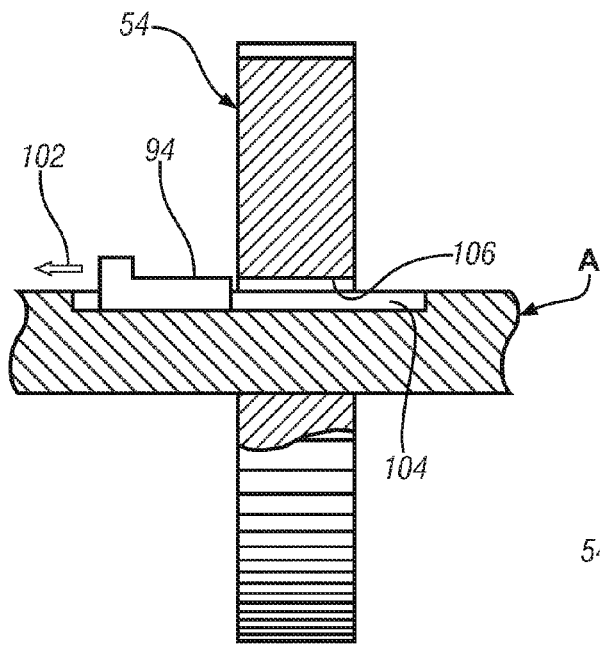
FIGS. 7A through 7C detailed views of engagement features of an output shaft and an output gear, in accordance with the present disclosure.

Referring now to FIG. 7A, a detailed view of output shaft A disengagement from the output gear 54 when the active material actuator 44 is unactuated, is illustrated in accordance with a present embodiment. The output shaft A includes a key track 104 wherein the sliding key 94 coupled to the driver section 90 of the plunger arm 70 is free to slide upon movement by the plunger arm 70. The output gear 54 includes a key slot 106 configured to receive the sliding key 94, wherein engagement between the sliding key 94 and the key slot 106 provides engagement between the output shaft A and the output gear 54. When the active material member 44 is unactuated the biasing member is exerting the bias force 102 in the direction of the arrow and thereby sliding the key 94 along the key track 104 away from the key slot 106 of the output gear 54. When the active material actuator 44 is unactuated, torque supplied from the drive shaft 36 of the motor 34 rotates output gear 54 but does not drive output shaft A because the output shaft A is disengaged from the output gear 54. Likewise, output shafts B and C disengagement from output gears 56 and 58 when active material actuators 46 and 48 are unactuated operate in the same manner as output shaft A as described above.

Referring to FIGS. 5 and 6B, selective operation of the active material actuator 44 is in the actuated position. As shown in FIG. 5, an actuated position refers to active material actuator 44 selectively engaged to output shaft A in the "on" position. As shown in FIG. 6B, the switch 84 is closed, therefore the active material member 68 is energized. The energy provided by the battery 82 increases the temperature of the active material member 68, wherein the temperature increase transforms the active material member 68 from the martensite phase to the austenite phase. As discussed earlier, the martensite to austenite transformation is accompanied by the generation of a force that acts to recover the strain imposed on the active material member 68 in the martensite phase. This strain recovery and the corresponding force developed in the active material member 68 overcomes the bias force 102 and slides the plunger arm 70 in the direction of the actuation arrow 108, wherein the driver section 90 of the plunger arm 70 drives the sliding key 94 to engage the output shaft A to the output gear 54 when the active material actuator 44 is actuated. The top surface 92 of the end bar 88 and the protrusion 76 of the active material member 68 remain in mechanical communication. Likewise, the features and operation of active material actuators 46 and 48 are the same with respect to active material actuator 44 as described above.

Figure 7B:
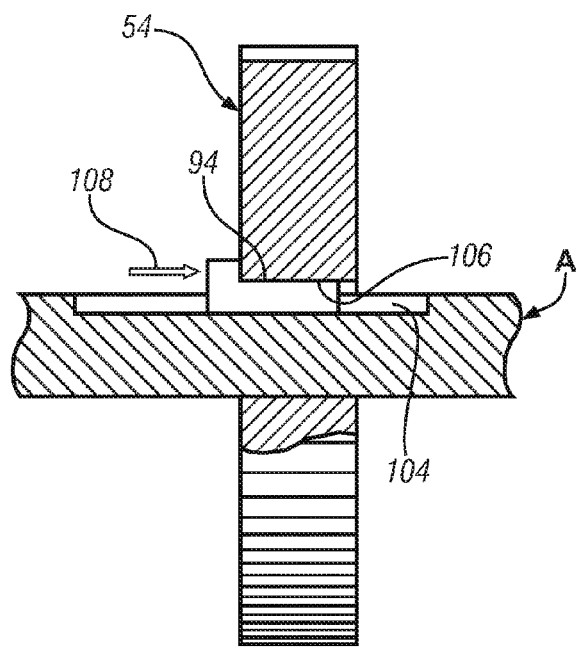

Referring now to FIG. 7B, a detailed view of output shaft A engagement to the output gear 54 of the transmission 42 when the active material actuator 44 is actuated, is illustrated in accordance with a present embodiment. Engagement between the sliding key 94 and the key slot 106 of the output gear 54 provides engagement between the output shaft A and the output gear 54. When the active material member 68 is actuated, the strain recovery provided by the transformation of the active material member 68 from martensite to austenite overcomes the force 102 the biasing member 72 is exerting on the plunger arm 70. The sliding key 94 is driven by the plunger arm 70 in the direction of the actuation arrow 108 along the key track 104, wherein the sliding key 94 is received by the key slot 106 of the output gear 54. When the sliding key 94 is received by key slot 106 of the output gear 54, the output shaft A is engaged to the output gear 54. When the active material is actuated, thereby providing engagement between the output shaft A and the output gear 54, torque supplied from the drive shaft of the motor is utilized by the selectively actuated output shaft A. Likewise, output shafts B and C engagement to output gears 56 and 58 when active material actuators 46 and 48 are actuated operate in the same manner as output shaft A as described above.

Figure 7C:
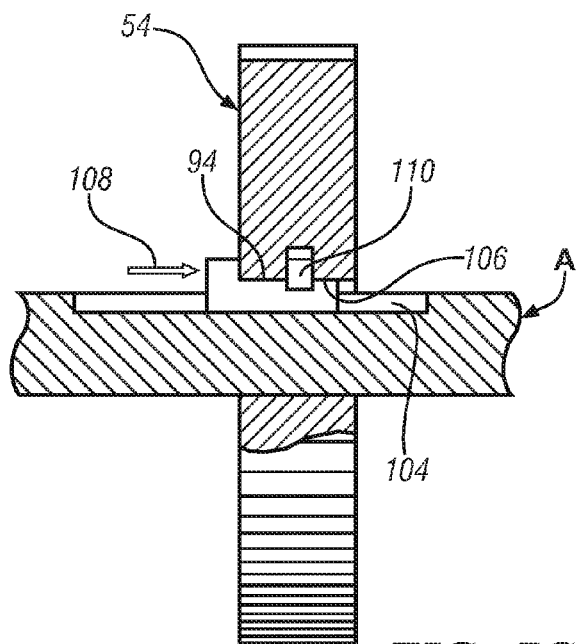

Referring to FIG. 7C, in an alternative embodiment of the present invention, a releasable locking mechanism 110 is provided and configured to couple the sliding key 94 to the output shaft A once engagement is established. The releasable locking mechanism 110 locks output shaft A engagement to the output gear 54, wherein the biasing force 102 will not affect movement on the plunger arm 70. Additionally, the locked engagement provided by the releasable locking mechanism 110 allows for the active material actuator 44 to be switched to the "off" position and deenergized. When selected torque to the output shaft A is no longer desired, the releasable locking mechanism 110 will release and disengage the output shaft A from the output gear 54, wherein the bias force 102 provided by the biasing member 72 will move the plunger arm 70 to the unactuated position. One having skill the art will appreciate that releasable locking mechanism 110 includes a benefit of extending a service life of the active material mechanism by only using the active material as a method to actuate engagement, while maintaining engagement through the releasable locking mechanism.

In an alternative embodiment, the releasable locking mechanism 110 may be incorporated on the active material actuator 44. For example, the releasable locking mechanism 110 may be mechanically coupled to the end bar 88 of the plunger arm 70 when the active material actuator 44 is actuated or in the "on" position, and hold the plunger arm 70 in this position when the active material actuator 44 is unactuated. A separate actuator could be incorporated to be actuated to disengage the locking mechanism 110. The locking mechanism may be spring-loaded and have a wedge portion, wherein the end bar 88 slides over a tapering section of the wedge portion when the active material actuator 44 is actuated. The plunger arm 70 locks into position when the end bar 88 falls over the tapered end of the wedge portion. The auxiliary unlocking actuator is thereby required to overcome the force of the biasing member 72 for the locking mechanism 110 to retract the wedge portion and allow the biasing member 72 to retract the plunger arm 70 back.

Figures 9A, 9B:
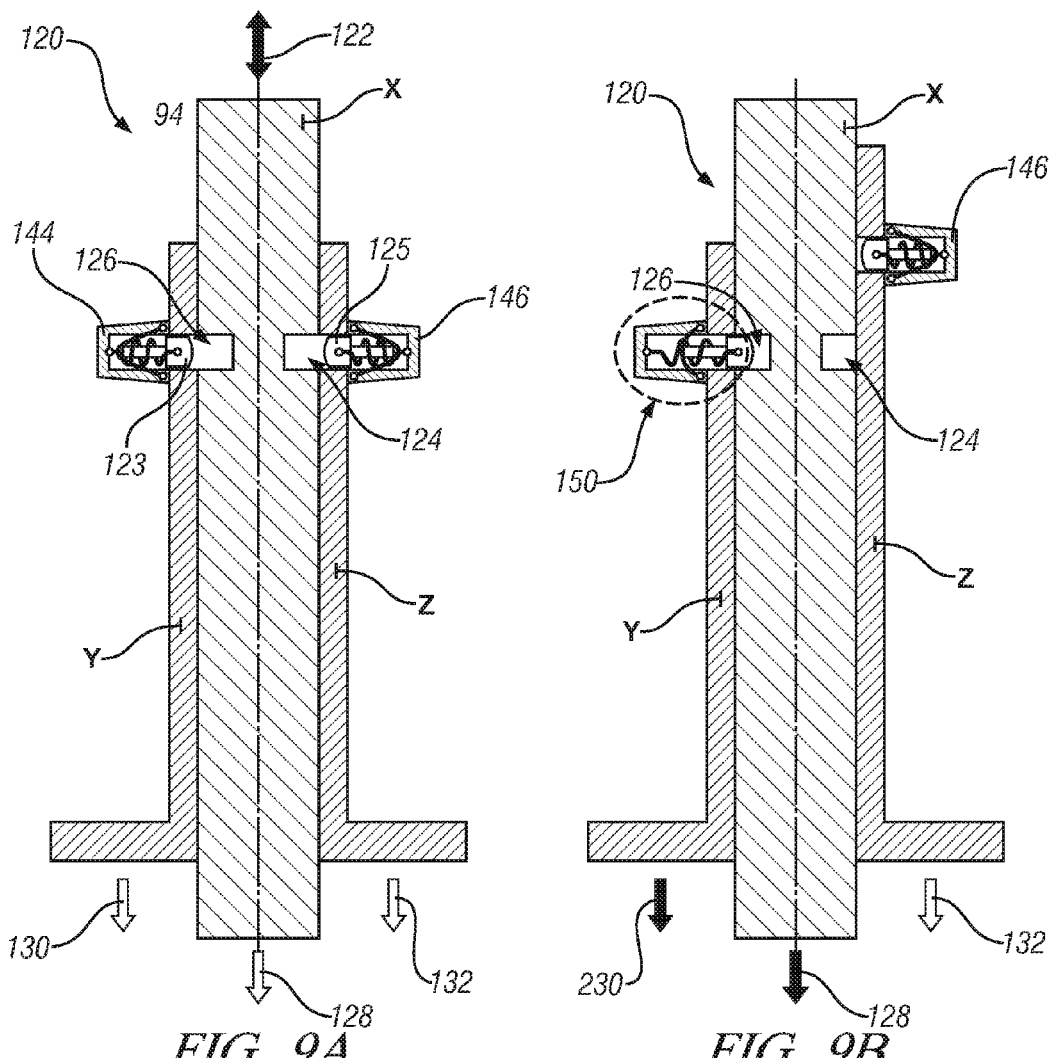
FIGS. 9A and 9B are detailed views of a translatory force distributor for distributing a translatory load to a plurality of output pins, in accordance with the present disclosure.

Referring now to FIGS. 9A and 9B, in accordance with an alternative embodiment of a primary actuator providing a translatory force, a translatory force distributor 120 for distributing a translatory input 122 to a plurality of output pins Y and Z is depicted. The translatory primary actuator 120 includes an input pin X and the output pins Y and Z, wherein the input pin X includes input slots 126, 124, and the output pins Y and Z comprise respective active material actuators 144, 146. When the active material actuator 144 is actuated, engagement is provided between input pin X and output pin Y when the input slot 126 is aligned with the active material actuator 144 and a mechanical coupling feature 123 coupled to the active material actuator 144 is moved by the active material actuator 144 to partially overlap with input pin X, thereby mechanically coupling input and output pins X, Y, respectively. Likewise, when the active material actuator 146 is actuated, engagement is provided between input pin X and output pin Z when the input slot 124 is aligned with active material actuator 146 and a mechanical coupling feature 125 coupled to the active material actuator 146 is moved by the active material actuator 146 to partially overlap with the input pin X, thereby coupling input and output pins X, Z respectively.

Referring to FIG. 9A, the input pin X is unloaded as represented by arrow 128, and therefore, the output pins Y and Z are unloaded as represented by arrows 130, 132, respectively. Additionally, the active material actuators 144, 146 are unactuated, and therefore, no engagement is provided between the input pin X and the output pin Y or between the input pin X and the output pin Z.

Referring to FIG. 9B, in a non-limiting example, a translatory input 122 is applied to the input pin X. Before the system is used, the slot 126 of the input pin X is aligned with the active material actuator 144 of the output pin Y. Referring to arrow 150, when the active material actuator 144 is activated, the active material actuator thereby provides engagement between the input and output pins X, Y, respectively, as described above. When the input and output pins X, Y, respectively, are engaged, the translatory input 122 to the input pin X thereafter is shared with the output pin Y, represented by arrow 230. However, the input pin X is not mechanically coupled with the output pin Z. Because the input and output pins X, Z, respectively, are not engaged, the translatory input 122 applied to input pin X is not shared with output pin Z, represented by arrow 132. It should be appreciated that the slots on the input pin, and the actuators on the output pins, may be aligned and arranged in any configuration that provides a translatory load from an input pin to one or more output pins. Additionally, in other configurations, the input pin may contain additional slots and the output pins may each contain more than one active material actuator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for selective power transfer from a primary actuator to at least one of a plurality of output shafts, the method comprising:
monitoring a desired output configuration;
providing an active material actuator including an engagement mechanism and a mechanical coupling device to achieve the desired output configuration, the mechanical coupling device slidingly engaged upon one of the plurality of output shafts and configured to slide upon the output shaft in a first direction when the active material actuator is unactuated and in an opposite second direction when the active material actuator is actuated; and
selectively actuating the active material actuator including the engagement mechanism and the mechanical coupling device to achieve the desired output configuration by mechanically coupling one of the plurality of output shafts to a respective output gear member through the mechanical coupling device to provide engagement with the primary actuator, the output shaft mechanically coupled to the respective output gear member when the mechanical coupling device sliding upon the output shaft in the second direction is received by a slot in the respective output gear member, wherein the engagement mechanism comprises
- an active material member comprising a continuous wire of constant cross-section including a protruded portion and two terminal ends each crimped to a housing of the active material actuator, wherein one of the terminal ends is electrically coupled to an electrical energy source to energize said active material member when said active material actuator is unactuated;
- a plunger arm including a shaft section, a first end having an end bar extending perpendicular to said shaft section and mechanically coupled to said protruded portion of said active material member and a second end mechanically coupled to said mechanical coupling device for coupling the output shaft when the active material actuator is actuated,
- a support secured to the housing of the active material actuator and including an aperture through an axial center of the support for said plunger arm to slide freely,
- a biasing member located between said support and the end bar of the plunger arm, wherein the biasing member includes a first end in contact with a bottom surface of said end bar and a second end in contact with a top surface of said support,
- wherein when said active material actuator is unactuated, said active material member is de-energized and said biasing member exerts a bias force against said end bar of said plunger arm, thereby biasing said plunger arm in the first direction toward said active material member such that the mechanical coupling device is not received by the slot and said active material member is deformed, and
- wherein when said active material actuator is actuated, said active material member is energized to recover said deformation on said active material member, thereby overcoming said bias force to linearly translate said second end of said plunger arm in the second direction towards the one of said output members such that the mechanical coupling device is received by the slot in the output member.

2. The method of claim 1, further comprising selectively actuating a plurality of active material actuators to control respective ones of the plurality of output shafts wherein each of the plurality of active material actuators controls the transfer of power to a respective one of the plurality of output shafts.

3. The method of claim 1, further comprising:
determining the desired output configuration based upon an available input power and desired power to the plurality of output shafts.

4. Method for selective torque transfer from a torque generating device to at least one of a plurality of output shafts, the method comprising:
monitoring a desired configuration of the plurality of output shafts;
providing an active material actuator including a mechanical coupling device to achieve the desired configuration of the plurality of output shafts, the mechanical coupling device slidingly engaged upon one of the plurality of output shafts and configured to slide upon the output shaft in a first direction when the active material actuator is unactuated and in an opposite second direction when the active material actuator is actuated; and
actuating the active material actuator including the mechanical coupling device to achieve the desired configuration of the plurality of output shafts by mechanically coupling the one of the plurality of output shafts to a respective output gear member of a reduction gear set through the mechanical coupling device to provide engagement with the torque generating device, the output shaft mechanically coupled to the respective output gear member when the mechanical coupling device sliding upon the output shaft in the second direction is received by a slot of the respective output gear member, wherein the active material actuator comprises
- an active material member comprising a continuous wire of constant cross-section including a protruded portion and two terminal ends each crimped to a housing of the active material actuator, wherein one of the terminal ends is electrically coupled to an electrical energy source to energize said active material member when said active material actuator is unactuated;
- a plunger arm including a shaft section, a first end having an end bar extending perpendicular to said shaft section and mechanically coupled to said protruded portion of said active material member and a second end mechanically coupled to said mechanical coupling device for coupling the output shaft to the respective output gear member when the active material actuator is actuated,
- a support secured to the housing of the active material actuator and including an aperture through an axial center of the support for said plunger arm to slide freely,
- a biasing member located between said support and the end bar of the plunger arm, wherein the biasing member includes a first end in contact with a bottom surface of said end bar and a second end in contact with a top surface of said support,
- wherein when said active material actuator is unactuated, said active material member is de-energized and said biasing member exerts a bias force against said end bar of said plunger arm, thereby biasing said plunger arm in the first direction toward said active material member such that the mechanical coupling device is not received by the slot and said active material member is deformed, and
- wherein when said active material actuator is actuated, said active material member is energized to recover said deformation on said active material member, thereby overcoming said bias force to linearly translate said second end of said plunger arm in the second direction towards the respective output gear member such that the mechanical coupling device is received by the slot in the respective output gear member.

5. The method of claim 4, wherein the active material actuator comprises a shape memory alloy actuator.

6. The method of claim 4, further comprising actuating a plurality of active material actuators each including a respective mechanical coupling device to achieve the desired configuration of the plurality of output shafts to mechanically couple respective ones of the plurality of output shafts to respective ones of a plurality of output gear members of the reduction gear set provides engagement with the torque generating device through the respective mechanical coupling devices.

7. The method of claim 4, wherein coupling the one of the plurality of output shafts to the respective output gear member of the reduction gear set provides engagement with the torque generating device through the mechanical coupling device establishes the one of the plurality of output shafts in one of a forward direction and a reverse direction.

8. The method of claim 4, wherein coupling the one of the plurality of output shafts to the respective output gear member of the reduction gear set provides engagement with the torque generating device establishes one of a plurality of gear ratios between the torque generating device and the one of the plurality of output shafts.

9. The method of claim 4, further comprising unactuating the active material actuator and maintaining engagement of the one of the plurality of output shafts to the torque generating device with a locking mechanism.

10. The method of claim 4, further comprising:
utilizing the plurality of output shafts to control vehicular seat adjustments.

11. Apparatus for selective power transfer from a primary actuator to one of a plurality of output shafts, the apparatus comprising:
   a transmission comprising a plurality of output members coupled to an input member, the input member coupled to the primary actuator; and
   an active material actuator including a mechanical coupling feature coupling one of the plurality of output shafts to one of the plurality of output members when the active material actuator is activated, the mechanical coupling feature slidingly engaged upon the one of the plurality of output shafts and configured to slide upon the output shaft in a first direction when the active material is deactivated and in an opposite second direction when the active material actuator is activated, wherein the output shaft is coupled to the one of the plurality of output members when the mechanical coupling feature sliding upon the output shaft in the second direction is received by a slot in the output member, wherein the active material actuator comprises
      an active material member comprising a continuous wire of constant cross-section including a protruded portion and two terminal ends each crimped to a housing of the active material actuator, wherein one of the terminal ends is electrically coupled to an electrical energy source to energize said active material member when said active material actuator is activated;
      a plunger arm including a shaft section, a first end having an end bar extending perpendicular to said shaft section and mechanically coupled to said protruded portion of said active material member and a second end mechanically coupled to said mechanical coupling feature for coupling the output shaft when the active material actuator is activated,
      a support secured to the housing of the active material actuator and including an aperture through an axial center of the support for said plunger arm to slide freely,
      a biasing member located between said support and the end bar of the plunger arm, wherein the biasing member includes a first end in contact with a bottom surface of said end bar and a second end in contact with a top surface of said support,
   wherein when said active material actuator is deactivated, said active material member is de-energized and said biasing member exerts a bias force against said end bar of said plunger arm, thereby biasing said plunger arm in the first direction toward said active material member such that the mechanical coupling device is not received by the slot and said active material member is deformed, and
   wherein when said active material actuator is activated, said active material member is energized to recover said deformation on said active material member, thereby overcoming said bias force to linearly translate said second end of said plunger arm in the second direction towards the one of said output members such that the mechanical coupling feature is received by the slot in the output member.

12. The apparatus of claim 11, further comprising:
   a plurality of active material actuators each including a respective mechanical coupling feature coupling respective ones of the plurality of output shafts to respective ones of the plurality of output members when the respective active material actuator is activated.

13. The apparatus of claim 12 further comprising:
   a control module determining a desired configuration for the plurality of output shafts and selectively activating the plurality of active material actuators to achieve the desired configuration of the plurality of output shafts.

14. The apparatus of claim 11, wherein the active material actuator comprises a shape memory alloy actuator.

15. The apparatus of claim 11, wherein the active material member is selected from the group consisting of an electroactive polymer, a piezoelectric motor, a magnetostrictive material, and an electrorestrictive material.

16. The apparatus of claim 11, wherein the transmission utilizes an internal structure selected from the group consisting of a gear train, a fluid transmission, a linkage, a belt drive, and a rope drive.

* * * * *